US011455769B2

(12) United States Patent
Ratković et al.

(10) Patent No.: US 11,455,769 B2
(45) Date of Patent: Sep. 27, 2022

(54) CONTAINER FOR PHYSICALLY BASED RENDERING

(71) Applicant: VNTANA, INC., Chatsworth, CA (US)

(72) Inventors: Jure Ratković, Zagreb (HR); Hayk Bezirganyan, Burbank, CA (US); Travis Paul Dorschel, Issaquah, WA (US); Ashley Crowder, Culver City, CA (US); Benjamin Conway, Chicago, IL (US)

(73) Assignee: VNTANA, INC., Chatsworth, CA (US)

( * ) Notice: Subject to any disclaimer, the term of this patent is extended or adjusted under 35 U.S.C. 154(b) by 0 days.

(21) Appl. No.: 17/155,535

(22) Filed: Jan. 22, 2021

(65) Prior Publication Data

US 2021/0225076 A1    Jul. 22, 2021

Related U.S. Application Data

(60) Provisional application No. 62/964,311, filed on Jan. 22, 2020.

(51) Int. Cl.
  *G06T 15/06* (2011.01)
  *G06T 17/20* (2006.01)
  *G06T 15/50* (2011.01)

(52) U.S. Cl.
  CPC .............. *G06T 15/06* (2013.01); *G06T 15/50* (2013.01); *G06T 15/506* (2013.01); *G06T 17/20* (2013.01); *G06T 2210/21* (2013.01)

(58) Field of Classification Search
  CPC ....... G06T 15/06; G06T 15/50; G06T 15/506; G06T 17/20; G06T 2210/21
  See application file for complete search history.

(56) References Cited

U.S. PATENT DOCUMENTS

| 2014/0218390 A1* | 8/2014 | Rouet | G06T 15/503 345/612 |
| 2018/0190003 A1* | 7/2018 | Upadhyay | G06F 3/013 |
| 2018/0285674 A1* | 10/2018 | Zhou | A63F 13/52 |
| 2019/0362539 A1* | 11/2019 | Kurz | G06T 15/50 |

OTHER PUBLICATIONS

Guy, Stephane, and Cyril Soler. "Graphics gems revisited: fast and physically-based rendering of gemstones." ACM SIGGRAPH 2004 Papers. 2004. 231-238. (Year: 2004).*
Sturm, Timo, et al. "A unified GLTF/X3D extension to bring physically-based rendering to the web." Proceedings of the 21st International Conference on Web3D Technology. 2016. (Year: 2016).*

(Continued)

*Primary Examiner* — Daniel F Hajnik
(74) *Attorney, Agent, or Firm* — Behmke Innovation Group LLC; Kenneth J. Heywood; Jonathon P. Western

(57) ABSTRACT

In one embodiment, a device obtains visualization data that depicts a three-dimensional item. The device identifies, from the visualization data, one or more materials of the three-dimensional item. The device generates, based on the visualization data, physically based rendering data for the one or more materials of the three-dimensional item. The device forms a container that includes the visualization data and the physically based rendering data. The visualization data is stored using a file format that does not support the physically based rendering data.

17 Claims, 8 Drawing Sheets

(56) References Cited

OTHER PUBLICATIONS

Hui, K. C., A. H. C. Lee, and Y. H. Lai. "Accelerating refractive rendering of transparent objects." Computer Graphics Forum. Vol. 26 . No. 1. Oxford, UK: Blackwell Publishing Ltd, 2007. (Year: 2007).*

"13. Fresnel's Equations for Reflection and Transmission", online: https://www.brown.edu/research/labs/mittleman/sites/brown.edu.research.labs.mittleman/files/uploads/lecture13_0.pdf, Nov. 1, 2016, 23 pages, Brown.edu.

Duraikannan, Aravin, "An Experiment in Simulating Dispersive Refraction in Computer Graphics", online: http://mentis.ca/design/graphics/dispersion/, Feb. 1, 2001, 2 pages.

"Volume Ray Casting", online: https://en.wikipedia.org/wiki/Volume_ray_casting, Dec. 19, 2020, 3 pages, Wikimedia Foundation, Inc.

"Deriving the Fresnel Equations", online: http://physics.gmu.edu/~ellswort/p263/feqn.pdf, Mar. 28, 2011, 3 pages, George Mason University.

\* cited by examiner

CONTAINER FOR PHYSICALLY BASED RENDERING

RELATED APPLICATION

This application claims the benefit of and priority to U.S. Prov. Appl. Ser. No. 62/964,311, filed Jan. 22, 2020, entitled "CONTAINER FOR PHYSICAL-BASED RENDERING," by Bezirganyan, et al., the contents of which are incorporated herein by reference.

TECHNICAL FIELD

The present disclosure relates generally to digital image processing, and, more particularly, to a container for physically based rendering (PBR).

BACKGROUND

Currently available real-time, photorealistic rendering solutions are often proprietary and not cross-platform. For example, while popular game engines like Unity and Unreal Engine can provide photorealistic rendering in a game engine, they only port to mobile platforms by cutting rendering features.

In addition, three-dimensional (3D) files can be created in formats designed specifically for the web and mobile, which include the graphics language (GL) Transmission Format (glTF), the GL Transmission Format Binary (glB), and the Universal Scene Description (USDZ) format. However, the web and mobile based graphics application programming interfaces (APIs) do not support some of the physically based rendering (PBR) specifications for these different 3D formats to be able to achieve photorealistic real-time rendering.

SUMMARY

According to embodiments herein, a method is disclosed that comprises obtaining, by a device, visualization data that depicts a three-dimensional item. The method also comprises identifying, by the device and from the visualization data, one or more materials of the three-dimensional item. The method further comprises generating, by the device and based on the visualization data, physically based rendering data for the one or more materials of the three-dimensional item. The method also comprises forming, by the device, a container that includes the visualization data and the physically based rendering data, wherein the visualization data is stored using a file format that does not support the physically based rendering data.

In one embodiment, the file format is one of: graphics language (GL) Transmission Format (glTF), GL Transmission Format Binary (glB), Universal Scene Description (USDZ) format, or Filmbox (FBX) format. In another embodiment, forming the container comprises inserting, by the device, the physically based rendering data directly into a file having the file format in a free-form extras field of the file. In an additional embodiment, the physically based rendering data for the one or more materials comprises an index of refraction. In a further embodiment, the physically based rendering data for the one or more materials comprises high dynamic range (HDR) data. In another embodiment, the physically based rendering data for the one or more materials comprises bloom data. In a further embodiment, the physically based rendering data for the one or more materials comprises anti-aliasing data. In an additional embodiment, the physically based rendering data for the one or more materials comprises tonemapping data. In another embodiment, generating the physically based rendering data comprises computing reflected and refracted light for the one or more materials using one or more Fresnel equations. In an additional embodiment, the method also comprises providing the container to an endpoint client via an online application.

In some embodiments, the one or more materials comprise a gem or glass. In one embodiment, generating the physically based rendering data comprises rasterizing a front face of the gem as if it were opaque and performing ray tracing starting at the front face. In another embodiment, generating the physically based rendering data further comprises identifying intersections of light rays and a surface of the gem, in part by sorting polygons of the surface of the gem by area. In a further embodiment, generating the physically based rendering data further comprises assessing refracted light rays that exit the gem and sampling an environment map associated with the gem. In an additional embodiment, sampling the environment map comprises performing ray marching over a rendered frame buffer. In yet another embodiment, generating the physically based rendering data comprises computing a new cubemap for the gem that is centered around the gem, building a connectivity graph of faces of the gem, storing the connectivity graph of faces as a texture, and identifying a closest intersection of a ray of light between neighboring faces of the gem.

In another embodiment, the one or more materials comprises a metal. In an additional embodiment, generating the physically based rendering data comprises rasterizing the visualization data using a parameter that quantifies a degree of metalness of the one or more materials.

According to various embodiments, a tangible, non-transitory, computer-readable medium is disclosed that stores program instructions that cause a device to execute a process comprising obtaining, by the device, visualization data that depicts a three-dimensional item. The process also comprises identifying, by the device and from the visualization data, one or more materials of the three-dimensional item. The process further comprises generating, by the device and based on the visualization data, physically based rendering data for the one or more materials of the three-dimensional item. The process additionally comprises forming, by the device, a container that includes the visualization data and the physically based rendering data, wherein the visualization data is stored using a file format that does not support the physically based rendering data.

In additional embodiments, an apparatus comprises one or more network interfaces, a processor coupled to the one or more network interfaces and configured to execute one or more processes, a memory configured to store a process that is executable by the processor. When executed, the process is configured to obtain visualization data that depicts a three-dimensional item. The process is also configured to identify, from the visualization data, one or more materials of the three-dimensional item. The process is further configured to generate, based on the visualization data, physically based rendering data for the one or more materials of the three-dimensional item. The process is additionally configured to form a container that includes the visualization data and the physically based rendering data, wherein the visualization data is stored using a file format that does not support the physically based rendering data.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
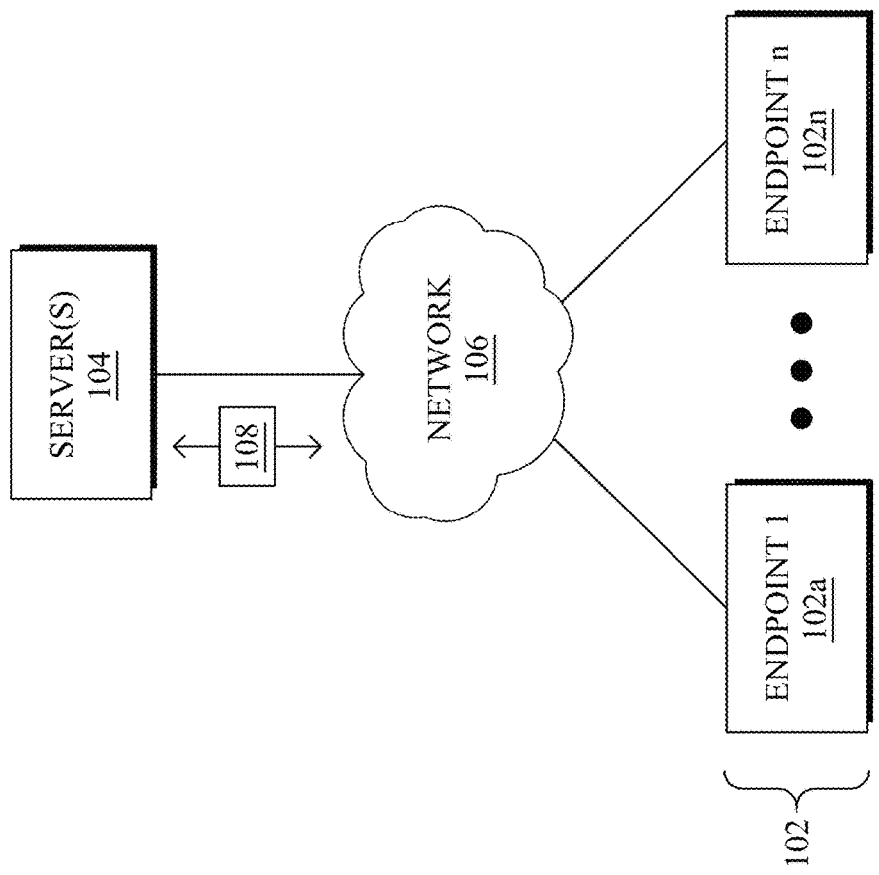
FIG. 1 illustrates an example communication system.

FIG. 1 illustrates an example communication system 100, according to various embodiments. As shown, communication system 100 may generally include n-number of endpoint devices 102 (e.g., a first endpoint device 102a through $n^{th}$ endpoint device 102n) interconnected with one or more servers 104 by a network 106.

In general, endpoint devices 102 may comprise computing devices capable of storing, processing, and communicating data. For instance, endpoint devices 102 may comprise mobile phones, tablets, wearable electronic devices (e.g., smart watches, smart glasses, etc.), desktop computers, or any other known form of device capable of performing the techniques herein.

During operation, endpoint devices 102 and server(s) 104 may be communicatively coupled with one another, either directly or indirectly, such as by leveraging a communication infrastructure that forms network 106. For instance, devices 102 and server(s) 104 may communicate with one another via the Internet or form of network 106 (e.g., a multiprotocol label switching network, etc.). Accordingly, network 106 may comprise any number of wide area networks (WANs), local area networks (LANs), personal area networks (PANs), and/or direct network connections between any of these components.

More specifically, example network connections and infrastructure of network 106 may include, but are not limited to, connections that leverage wireless approaches such as Wi-Fi, cellular, satellite, and the like, and/or wired approaches such as Ethernet, cable Internet, fiber optics, and the like. In further embodiments, endpoint devices 102 may communicate directly with one another using a shorter-range communication approach, such as via Bluetooth, Z-Wave, ZigBee, 6LoWPAN, other near field communication (NFC) approaches, infrared, visible light, or the like. In yet another embodiment, one of devices 102 may provide connectivity to network 106 on behalf of the other, essentially acting as a communications relay.

Server(s) 104 may comprise one or more servers that provide a service configured to facilitate the transfer of visualization data 108 between server(s) 104 and endpoint devices 102. Generally speaking, visualization data 108 may take the form of any number of files that, when processed by a receiving endpoint device in endpoint devices 102, causes that endpoint device to render visualization data 108 onto one or more electronic displays associated with the endpoint device. For instance, the endpoint device may display visualization data 108 via an integrated screen, one or more monitors, one or more televisions, one or more virtual reality (VR) or augmented reality (AR) displays, one or more projectors of a hologram system, or the like.

For instance, endpoint device 102a may upload visualization data 108 to a server 104 that is later downloaded by endpoint device 102n and displayed to a user. As noted above, the ever-improving visualization hardware of endpoint devices, such as endpoint devices 102, there is a corresponding increase in the amount of visualization data 108 that needs to be communicated across network 106. In addition, this increase in visualization data 108 will also result in greater resource consumption by the receiving endpoint device 102n. Accordingly, efficiency in data compression and rendering are essential to providing the best possible image and performance with respect to visualization data 108.

As noted above, current photorealistic rendering solutions are not cross-platform, and often only port to mobile platforms by cutting rendering features. As also noted, web and mobile based 3D graphics APIs do not support some of the physically based rendering (PBR) specifications for these different 3D formats to be able to achieve photorealistic real-time rendering. For instance, current offerings are missing PBR specifications such as index of refraction, reflection, transparency, bloom, high dynamic range, gamma correction, anti-aliasing and tonemapping, which results in very basic non-photorealistic rendering of 3D models that include materials such as glass, gems, and anything transparent, reflective, or refractive.

In particular, one of the primary reasons for the current inability to support many of the PBR specifications are the highly varying levels of graphics APIs to support across web browsers, mobile platforms, and hardware, as well as the computational difficulty of photorealistic rendering.

Figure 2:
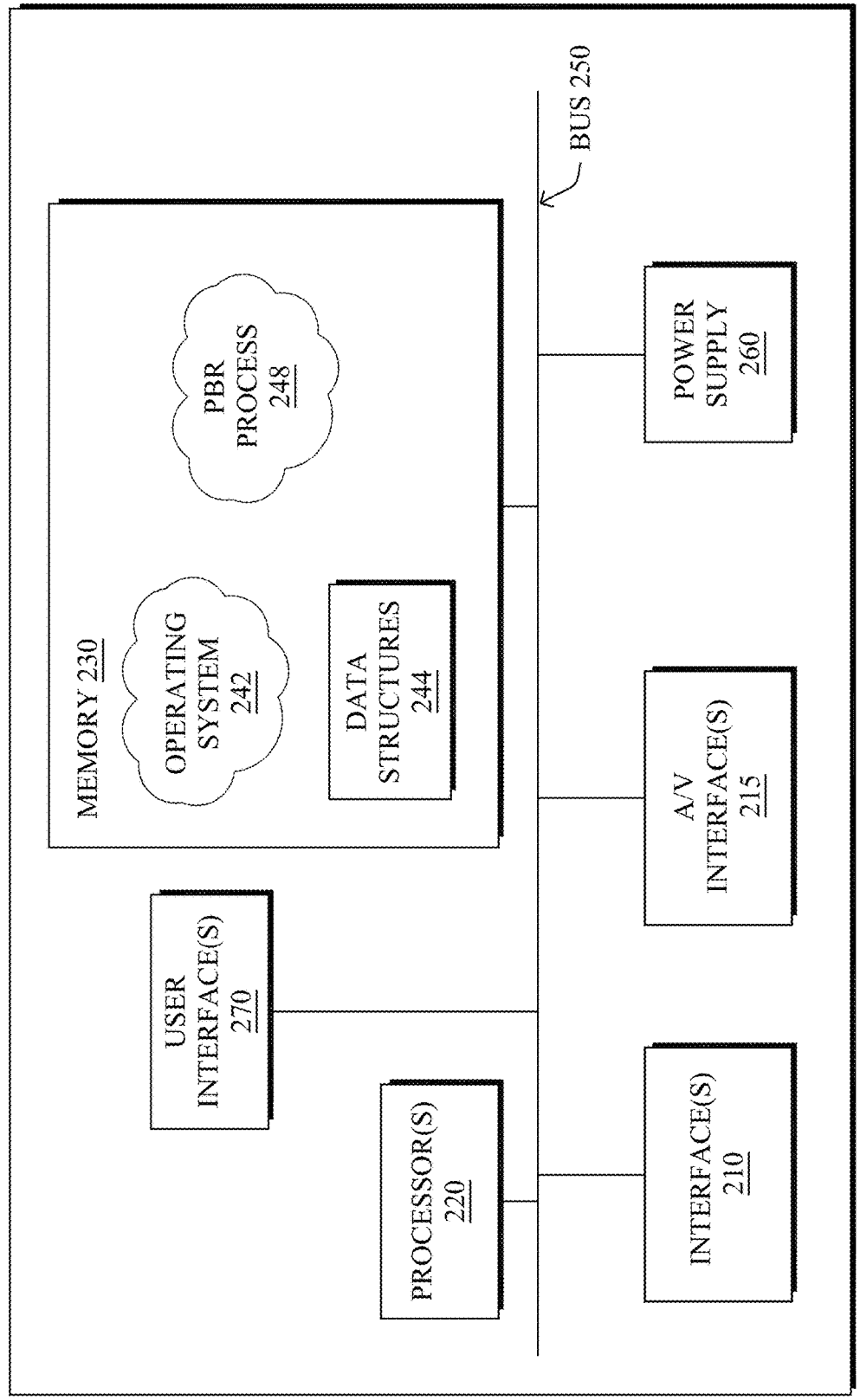
FIG. 2 illustrates an example device.

FIG. 2 illustrates an example schematic block diagram of a computing device 200 that may be used with one or more embodiments described herein, such as any of endpoint devices 102 and/or server(s) 104 shown in FIG. 1, or another device in communication therewith (e.g., an intermediary device). The illustrative device may comprise at least one network interface 210, one or more audio/video (A/V) interfaces 215, at least one processor 220, a memory 230, and user-interface(s) 270 (e.g., keyboard, monitor, mouse, etc.), interconnected by a system bus 250, as well as a power supply 260. Other components may be added to the embodiments herein, and the components listed herein are merely illustrative.

The network interface(s) 210 contain the mechanical, electrical, and signaling circuitry for communicating data over links coupled to a computer network. A/V interfaces 215 contain the mechanical, electrical, and signaling circuitry for communicating data to/from one or more A/V devices, such as cameras, displays, etc. The memory 230 comprises a plurality of storage locations that are addressable by the processor(s) 220 for storing software programs and data structures associated with the embodiments described herein. The processor(s) 220 may comprise hardware elements or hardware logic adapted to execute the software programs and manipulate the data structures 244. An operating system 242, portions of which are typically resident in memory 230 and executed by the processor, functionally organizes the machine by invoking operations in support of software processes and/or services executing on the machine. These software processes and/or services may comprise a PBR process 248, among other processes, according to various embodiments.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, where certain processes have been shown separately, those skilled in the art will appreciate that processes may be routines or modules within other processes.

Illustratively, certain aspects of the techniques described herein may be performed by hardware, software, and/or firmware, such as in accordance with the various processes and components described herein, which may contain computer executable instructions executed by the processor 220, such as PBR process 248, and/or associated hardware components to perform functions relating to the techniques described herein.

Specifically, in various embodiments, a device obtains visualization data that depicts a three-dimensional item. The device identifies, from the visualization data, one or more materials of the three-dimensional item. The device generates, based on the visualization data, physically based rendering data for the one or more materials of the three-dimensional item. The device forms a container that includes the visualization data and the physically based rendering data. The visualization data is stored using a file format that does not support the physically based rendering data.

Operationally, according to various embodiments, the techniques herein provide for PBR process 248 to generate and use a "container" object that allows photorealism to be achieved for different types of materials depicted on screen (e.g., a user interface 270), even across different data formats and rendering approaches/engines. As detailed below, the container is specifically configured to handle this diversity.

In general, the container object introduced herein represents a collection of material properties, mesh data, shaders, and/or executable code needed to render the model contained, in various embodiments. The container is, thus, self-sufficient and includes all of the information needed to render the object in a photorealistic way. In some embodiments, the container object also provides end-to-end encryption, ensuring security so that intercepted containers cannot be decrypted to allowing a malicious entity to access the underlying 3D model.

In one embodiment, the container used by PBR process 248 wraps material and mesh data in an existing format, such as, but not limited to, Graphics Language (GL) Transmission Format (glTF), Filmbox (FBX), or another suitable format. If the contained format does not support all of the material data needed to render the model, the container may also wrap that data outside of the file. For example, glTF currently does not support an index of refraction. However, the proposed container can still insert this into the free-form extras field of the glTF file, which can hold any user-specified data. The container can also inject the material data that can help to render refraction, transparency, bloom, high dynamic range, gamma correction, and/or tonemapping, as well as increase the anti-aliasing, to achieve a better output image quality.

Figure 3:
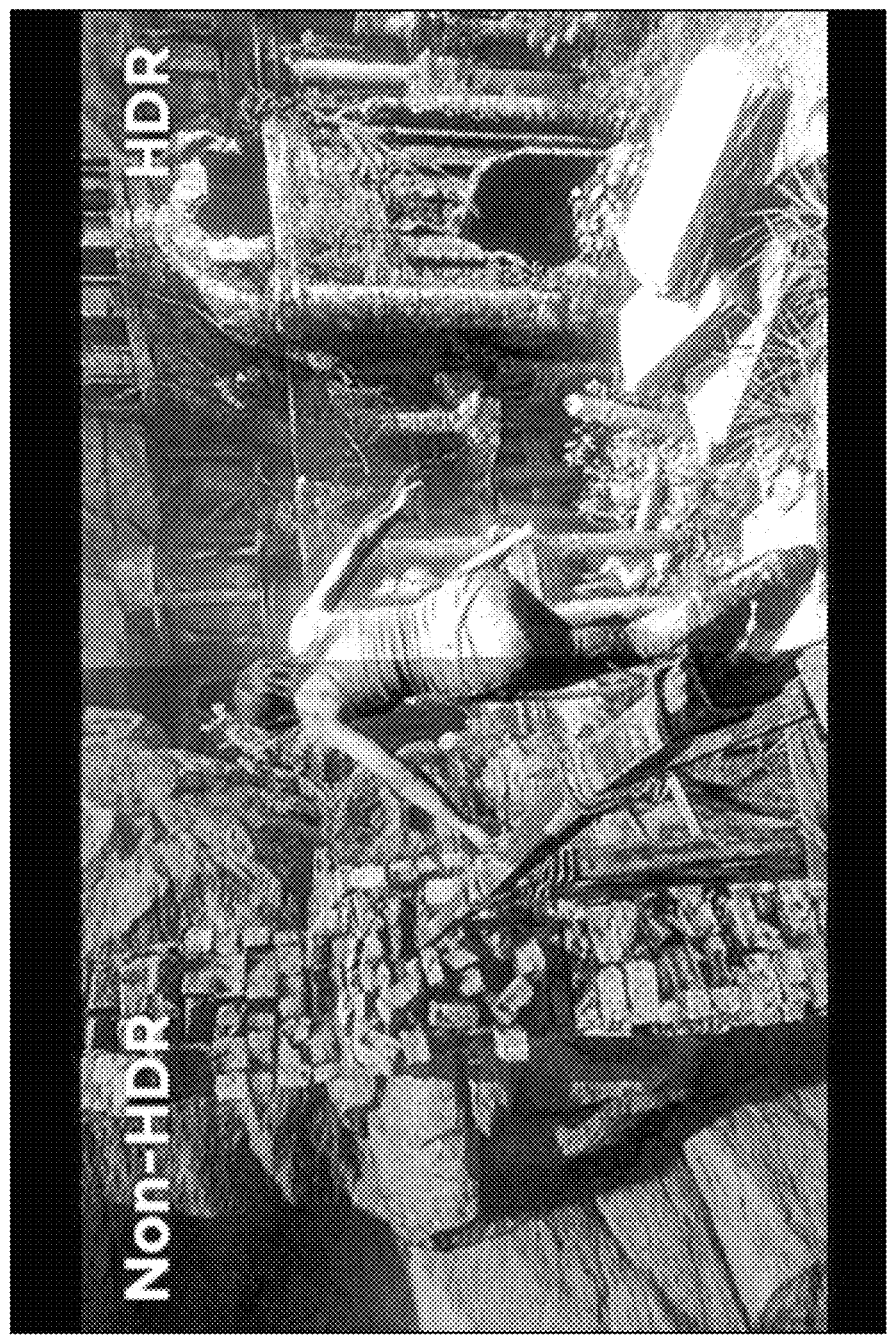
FIG. 3 illustrates an example image showing the effects of high dynamic range (HDR)

Regarding general rendering considerations, for photorealistic rendering, it is typically imperative to use high dynamic range (HDR) and gamma correction. HDR is used to model the immense differences in light intensity that occur in nature. For example, sunlight is thousands of times brighter than a lightbulb, but humans see equally well under both types of light. The effects of HDR can be seen in image 300 in FIG. 3.

Figure 4B:
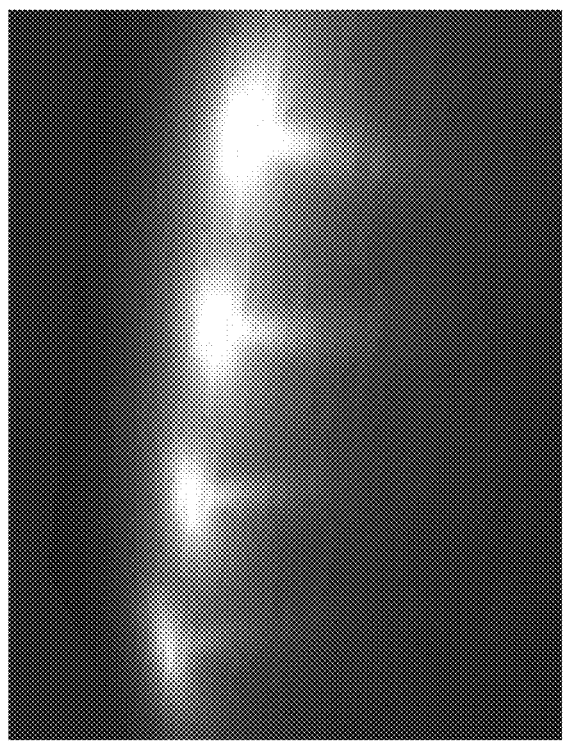
FIGS. 4A-4B illustrate example images showing the effects of visual correction.
Figure 4A:
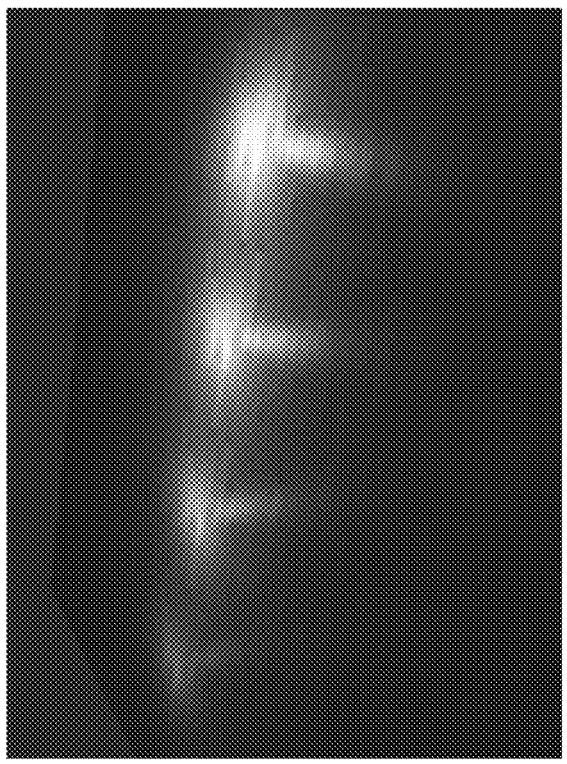

As would be appreciated, gamma correction is used to account for the nonlinearity of human vision. The shading data used for rendering and the on-screen output need to be in gamma space, tuned to be viewed by human eyes. On the other hand, the mathematical equations that comprise the shading model need to be in linear space. The conversion between these spaces is called gamma correction. FIGS. 4A-4B illustrate example images showing the effects of visual correction. More specifically, FIG. 4A illustrates an image 400 without gamma correction. Likewise, FIG. 4B illustrates image 402, which is the same image as in FIG. 4, but with gamma correction.

HDR and gamma correction are both ubiquitous mechanisms and supported by practically all desktop rendering software, from game engines to offline renderers. Support for HDR and gamma correction is mixed with respect to web applications, as the graphics application programming interfaces (APIs) needed to implement HDR and gamma correction are not universally supported across platforms.

Since industry-wide graphics API standards have yet to be developed, different versions of graphics APIs are required to be served. To this end, in some embodiments, PBR process 248 may, based on the platform of the endpoint device, generate a container on the novel container on the server end that injects all the necessary data, and encryption, if desired, into the model suitable for the endpoint platform to which it will be served. PBR process 248 may do so on demand or in advance of a request for the visualization data, such as by precaching the generated container. In some embodiments, PBR process 248 may generate the container in an effort to optimize the rendering quality of the graphics rendered at the endpoint. For example, the same 3D model may be rendered at a much higher quality on an iPhone 11 than on an iPhone 6 and PBR process 248 may take this into account when generating the container.

According to some embodiments, PBR process 248 may add various pre- and post-process effects to the container object, to enhance the rendering quality, such as, but not limited to, any or all of the following:

FXAA (fast approximate antialiasing) and SSAA (super sampling antialiasing) for antialiasing, which is used to smooth jagged edges in the rendered image;

Bloom, which spreads highlights outside of their geometrical bounds; and/or

Tonemapping, with which a set of colors can be mapped to a different set of colors, changing their tonal range.

These effects may be togglable within the container that PBR process 248 generates, ensuring that the rendering is scalable and adaptable to ensure great performance and give creatives the ability to adjust all the features.

In further aspects, PBR process 248 may also be configured to address current issues with gem rendering. In particular, gems and transparent objects are the most difficult 3D digital objects to render via a web application in a photorealistic manner because of all of the index of refraction and dispersion data that is needed. Indeed, common file formats used on the web, such as glTF and USDZ, do not include an index of refraction or dispersion data. Accordingly, in further embodiments, PBR process 248 may also include data in its generated container that improves the rendering of gems or similar 3D objects. In particular, PBR process 248 may establish the gem model with the following considerations in mind:
1. First, each gem to be rendered needs to be a separate mesh. To this end, in one embodiment, PBR process 248 may separate any depicted gems into separate meshes.
2. The performance tracks linearly with the number of triangles in the gem.
3. For each gem, its triangles should be sorted by surface area and store them into a floating-point texture. The triangles should also not be unpacked or indexed, either.
4. Any associated metal of the rendered item (e.g., as in the case of a piece of jewelry), should be rendered first, to occlude as much of the gem as possible. Rendering metal is much less performance intensive than ray tracing the gems, so rendering it first improves performance.

The physics of the rendering used by PBR process 248 are described as follows. First, PBR process 248 may compute the reflected and refracted ray using true Fresnel equations, not the Schlick's approximation, as is typically done in traditional PBR. The Schlick's method works well when forking with material metalness, which is reflectivity at zero incidence. The gems, however, require precise geometric optics to ray trace.

Figure 5:
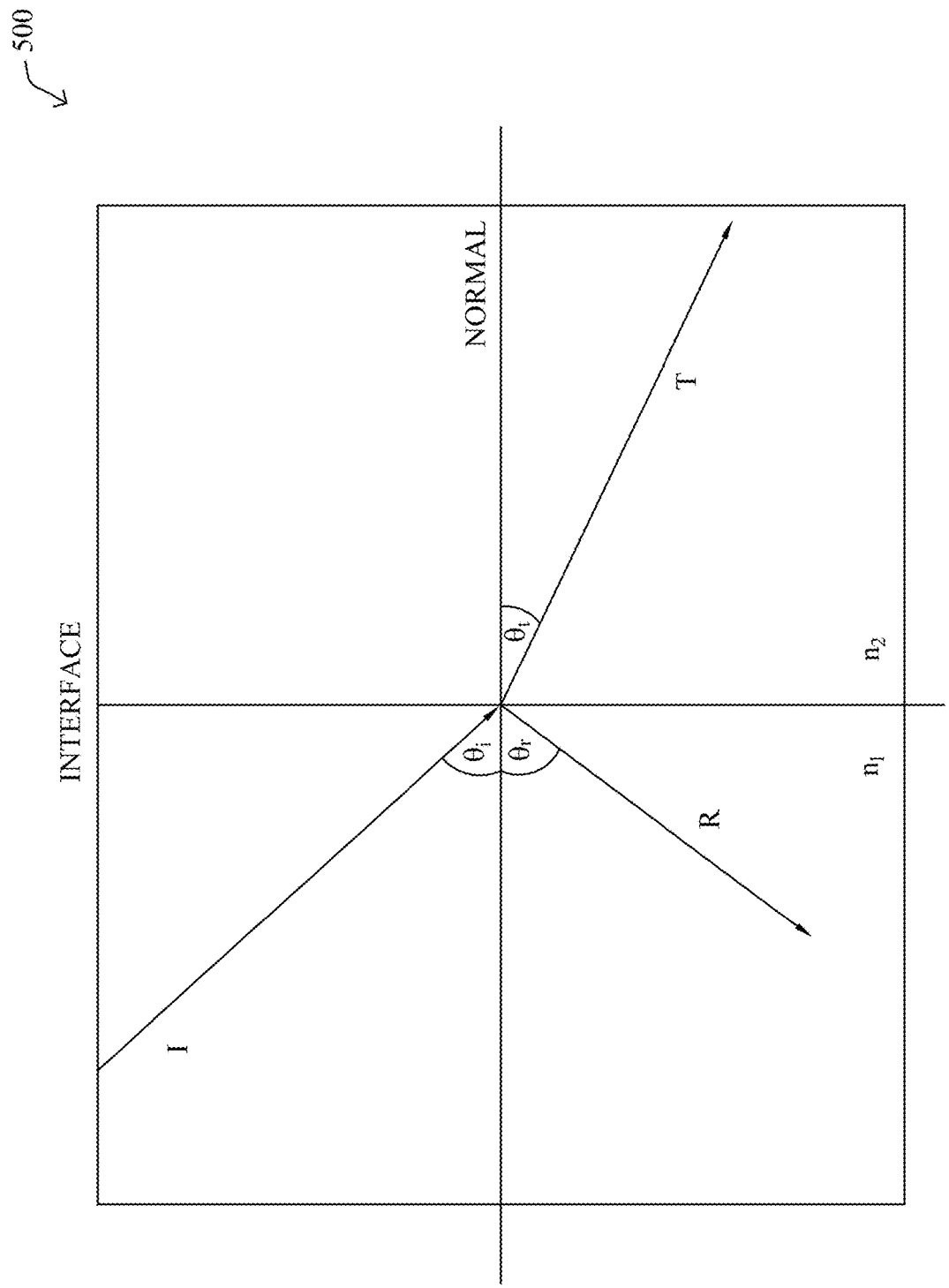
FIG. 5 illustrates an example of the reflection and refraction of an incident ray of light.

FIG. 5 illustrates an example 500 of the physics of light striking the interface between two media. In particular, an incident light I is transmitted through a first medium having a refractive index $n_1$, striking a second medium having a refractive index $n_2$ at an incident angle $\theta_i$ relative to the normal axis shown. Depending on these parameters, incident light I will be reflected as reflected light R at reflection angle $\theta_r$ and/or refracted as refracted light T at angle $\theta_t$.

More specifically, Snell's law states:

$$n_1 \sin \theta_i = n_2 \sin \theta_t$$

In addition, under the law of reflection, $$\theta_i = \theta_r$$

The polarization of the light with respect to the interface plane will affect the ratio of the intensity of the reflected light R to the refracted light T. Under the Fresnel equations, if the electric field is perpendicular to the incident axis, also known as transverse electric (TE), then the resulting ratio is as follows:

$$r_{TE} = \frac{E_r}{E_i} = \left( \frac{\cos\theta_i - \sqrt{n^2 - (\sin\theta_i)^2}}{\cos\theta_i + \sqrt{n^2 - (\sin\theta_i)^2}} \right)$$

where $E_r$ is the electric field of reflected light R, $E_i$ is the electric field of incident light I, and n is the ratio of $n_2$ to $n_1$.

If the incident light I is transverse magnetic, then the resulting ratio is as follows:

$$r_{TE} = \frac{E_r}{E_i} = \left( \frac{n^2\cos\theta_i - \sqrt{n^2 - (\sin\theta_i)^2}}{n^2\cos\theta_i + \sqrt{n^2 - (\sin\theta_i)^2}} \right)$$

In a further embodiment, PBR process 248 may also take into account the special case in which total internal reflection (TIR) would occur. As would be appreciated, TIR is the condition in which the incident light I is entirely reflected as light R and occurs when the incident angle $\theta_i$ is equal to the 'critical angle.' At other angles, at least a portion of incident light I will be refracted. Indeed, when light travels from a denser medium (e.g., a diamond) to a less dense one (e.g., air) there is an angle of incidence under which no light is refracted. This effect accounts for much of the distinct look of a diamond, as well as the shape of the diamond. Here, by taking into account the material type(s) involved in the item being depicted, PBR process 248 may also identify when TIR would occur and indicate this via the index of refraction for the item, accordingly.

Dispersion is also another factor that could affect the index of refraction of the optical medium and depends on the wavelength of the incoming light. To this end, in some embodiments, PBR process 248 may model the dispersion by performing ray tracing i-number of times, separately for the red (R), green (G), and blue (B) channels (e.g., with a separate index of refraction for each), and compositing the result. Prototyping the techniques herein has shown that a value of i=3 leads to suitable results, although other numbers of iterations could be selected, as desired. Computing the RGB indices of refraction of any type of gem can be accomplished through computational of parameters such as RGB to wavelength, wavelength to the index of refraction of the gem, etc.

According to various embodiments, PBR process 248 may also perform any or all of the following techniques:

Technique 1:

For each gem present in the model, the same process is applied:
1. Rasterize the front face of the gem, as if it were opaque. This is an important optimization and doing so allows the starting point for ray tracing to be performed at the surface of the gem, as opposed to the camera origin. The net result is that PBR process 248 will not have to evaluate the first ray bounce.
2. Iterate over the polygons (e.g., triangles, quadrilaterals, etc.) of the gem and identify ray-triangle intersections.
    a. Since the gem is convex, the first intersection is always the closest.
    b. Sorting the triangles by surface area in the model setup also speeds this up by ~30%, under the assumption that larger triangles are more likely to be hit by a ray of light.
3. When an intersection is found, calculate the reflected and refracted ray.
4. Assess refracted rays that exit the gem, sampling the environment map.
5. Recursively repeat steps 2-4 above, to assess the reflected light. The number of ray bounces may also be variable, allowing for PBR process 248 to perform quality/performance scaling.

Technique 2:

In another embodiment, the technique above can be improved by controlling the performance of step 4 using one or more configuration parameters. When set, for instance, instead of only sampling the environment map, the refracted ray can be ray marched by PBR process 248 in screen space over the already rendered frame buffer of the opaque parts of the image (e.g., the metal). Using the depth buffer, the closest intersection with the render in the framebuffer will be found and sampled, instead of the environment map. With this process, refractions of the metal in the gem can also be identified and represented.

Technique 3:

As would be appreciated, PBR process 248 iterating over all triangles can lead to resource bottlenecks in the two techniques above. If, however, the hardware and API support cubemaps, PBR process 248 may instead perform the following:

1. Compute a new cubemap for each gem:
   a. The cubemap C is centered around the gem;
   b. Each cubemap face has K×K pixels;
   c. For each pixel, find the gem face which has the following property: the angle between the face's normal and the vector from the cube center to the pixel center is minimal;
   d. Store the index of this plane in the pixel;
2. Build a connectivity graph of the faces of the gem and store it into a texture (faces are vertices and shared face edges become the graph's edges).
3. Sample C with the direction of the ray. Let the obtained face be called F;
4. Choose F's neighbor G which has the closest intersection with the ray;
5. F=G;
6. Repeat 2 and 3 while there is a closest neighbor;
7. The resulting F is the closest intersection.

Regarding performance notes, the techniques described herein may be quite performance intensive, and using high quality settings and big display resolutions can tax the most powerful of hardware. However, the rendering quality (as well as performance) is scalable, in some embodiments. In addition, PBR process 248 may have configurable parameters that control whether dispersion is evaluated and/or to set the number of ray bounces that are used. Another resource intensive operation is PBR process 248 storing the gem's mesh into the texture. Indeed, storing the normals with the positions or indexing the mesh is slower than having the mesh completely unpacked in memory. Moreover, using planes for intersection instead of triangles is slower. To this end, PBR process 248 may evaluate ray-plane intersections rather than ray-triangle intersections, in some instances. However, early bailing typically is not possible, which seems to have a bigger impact.

The techniques herein also notably address current issues with metal rendering. In particular, rendering pure metals photo realistically in real time, agnostic to the platform and hardware being rendered on is currently not possible because the current file formats available (e.g., glTF, USDZ, etc.) do not support storage of data for bloom, HDR, gamma correction, sampling anti-aliasing (SAA), or the like. As such, in further embodiments, PBR process 248 may also use the container introduced herein to implement improved metal rendering. Notably, these rendering operations are ubiquitous in many rendering engines, such as the UnReal and Unity game engines. However, they are not cross-platform. The container introduced herein, though, allows creatives to use these on the web across all types of platforms, consistently.

The rendering technique and physics are as follows:
Normal rasterization, with PBR material inputs:
  Metalness, or $F_0$, is the metal's reflectiveness of zero incidence;
  Roughness determines the shape and size of the highlights;
  Normal mapping can change the appearance of the surface, by adding scratches or deformities.

PBR shading:
  For direct lighting, Cook-Torrance specular GGX based BRDFs, as will be appreciated by those skilled in the art.
Image based PBR ambient lighting:
  By doing some prefiltering, HDRi images can be converted to radiance maps. With some clever sampling methods and BRDF precomputation, the object will be rendered as if each pixel in the original HDRi image is a light source.
  Tools are available for creating prefiltered cubemaps. To achieve crisp metallic reflections, the lowest available scale and bias should be used when filtering.

Figure 6A:
FIGS. 6A-6B illustrate example images rendered using the techniques herein.
Figure 6B:

FIGS. 6A-6B illustrate examples of gem and metal rendering using the techniques herein, according to various embodiments. More specifically, FIG. 6A illustrates an image 600 of a rendered ring that comprises both gem and metal materials. FIG. 6B illustrates another image 610 of a second ring that comprises both gem and metal materials.

Furthermore, the techniques herein also notably address current issues with transparency rendering, in some embodiments. In particular, rendering transparent materials like glass photo-realistically in real time, agnostic to the platform and hardware being rendered, is currently not possible because file formats lack index of refraction, dispersion, bloom, HDR, etc. Generalized transparent materials are the hardest problem in computer graphics. The exact solution is often intractable. For example, rendering a curved glass soda bottle with the same fidelity and technique the gems are rendered with above would be ~100 times slower, due to the processing power required to show the proper index of refraction, dispersion, bloom, HDR, etc. For instance, if a glass soda bottle is rendered in three seconds per frame, then a gem at the same quality would take ~30 seconds per frame.

These problems mainly stem from the exponential complexity of tracing rays through transparent media. According to various embodiments, PBR process 248 may solve these problems by not performing any ray tracing, but simply using per-pixel alpha blending with a physically-based Fresnel falloff function for the per pixel transparency of the item. This creates the effect of increased material reflectivity on sharp viewing angles. This effect is very closely associated with the "look" of glass, and rendering glass this way is usually more than satisfactory.

Figure 7:
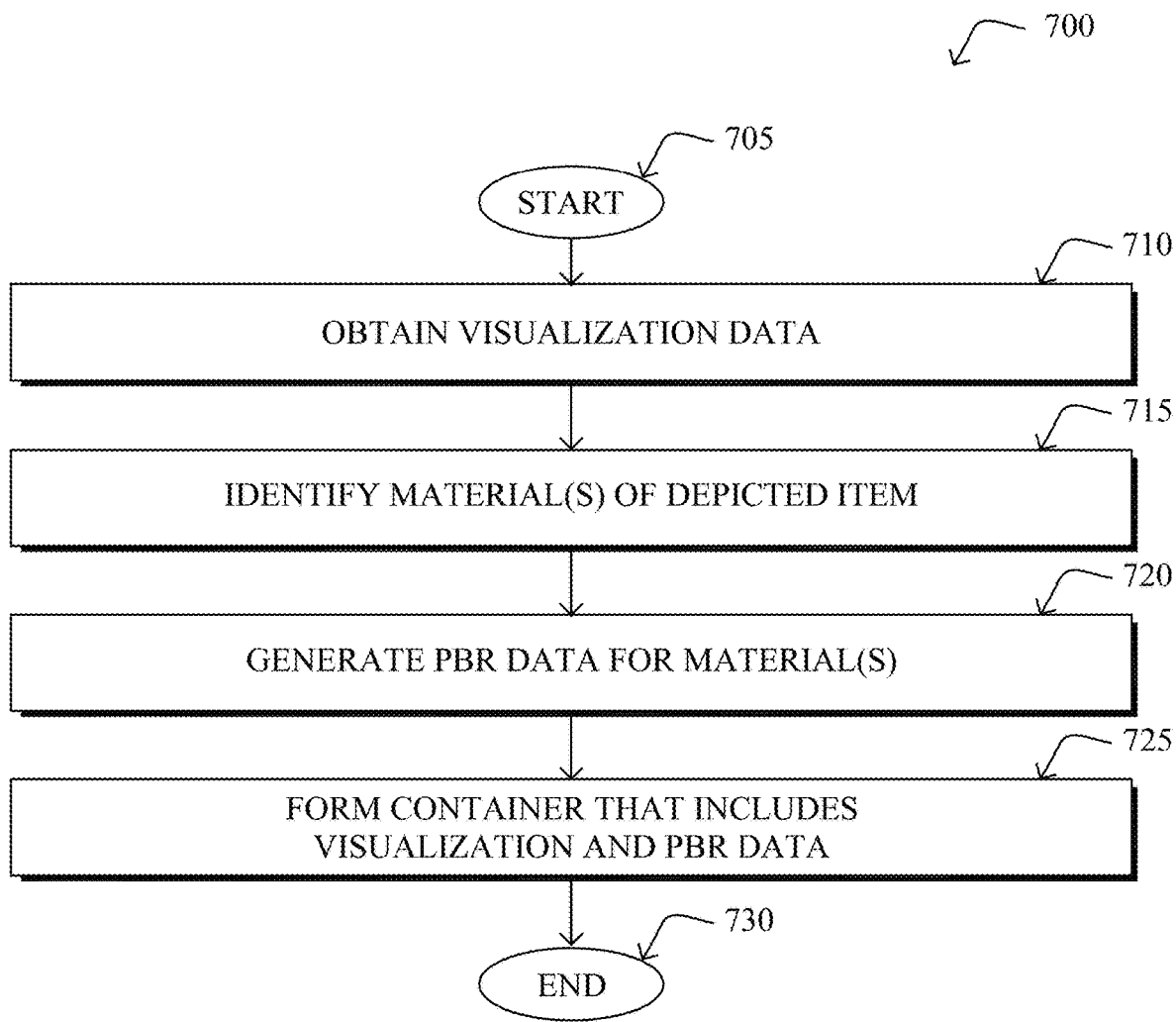
FIG. 7 illustrates an example simplified procedure for forming a container with physically based rendering data.

FIG. 7 illustrates an example simplified procedure for forming a container with physically based rendering data, according to various embodiments. For example, a non-generic, specifically configured device (e.g., device 200) may perform procedure 700 by executing stored instructions (e.g., PBR process 248). The procedure 700 may start at step 705, and continues to step 710, where, as described in greater detail above, the device may obtain visualization data that depicts a three-dimensional item. As would be appreciated, the three-dimensional (3D) item may be represented in the visualization data as a set of polygons (e.g., triangles, quadrilaterals, etc.) that are interlinked with one another as meshes.

At step 715, as detailed above, the device may identify one or more materials of the 3D item. For instance, the device may identify the item as comprising a gem, glass, metal, or other material. Depending on the material type, the device may also identify any number of physical properties of the material, such as its metalness, opaqueness, reflectivity, etc.

At step 720, the device may generate PBR data for the material(s) of the item, as described in greater detail above. For instance, the generated PBR data may comprise an index of refraction, HDR data, bloom data, anti-aliasing data, or tonemapping data. As would be appreciated, the material type may also affect how the device generates the PBR data. For instance, in the case of a gem, the device may use any or all of the techniques herein, to assess how rays of light will be reflected or refracted off the faces of the gem.

At step 725, as detailed above, the device may form a container that includes the visualization data and the physically based rendering data. In various embodiments, the visualization data is stored using a file format that does not support the physically based rendering data. For instance, the file format may be one of, but not limited to, any of the following: graphics language (GL) Transmission Format (glTF), GL Transmission Format Binary (glB), Universal Scene Description (USDZ) format, or Filmbox (FBX) format. Depending on the format, the device may include the PBR data in a free-form extras field of the file. In other cases, the PBR data may be stored externally from the file as part of the container. As would be appreciated, the container allows the visualization data to be ported to any number of different file formats and also facilitates rendering of the item in a photorealistic manner, such as on an endpoint client via an online application (e.g., a website, a retail application, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for a container object that achieves photorealism and can handle the diversity of many different materials requiring vastly different data and rendering techniques, such as gems, metals, and transparent materials, etc. This allows for more photorealistic images to be downloaded and rendered in systems that would not normally support this level of graphical detail, such as in the case of many web applications.

While there have been shown and described illustrative embodiments, it is to be understood that various other adaptations and modifications may be made within the spirit and scope of the embodiments herein. For example, the embodiments described herein may be used with other suitable rendering techniques, technologies, or formats, and those shown herein are merely examples. Also, while the embodiments have been generally described in terms of images, static or video images may benefit from the techniques herein, depending upon computational power. Further, additional processing may also be performed on the images, such as converting the image to a holographic display or projection, and so on.

Moreover, the embodiments herein may generally be performed in connection with one or more computing devices (e.g., personal computers, laptops, servers, specifically configured computers, cloud-based computing devices, cameras, mobile phones, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   obtaining, by a device, visualization data that depicts a three-dimensional item;
   identifying, by the device and from the visualization data, one or more materials of the three-dimensional item;
   generating, by the device and based on the visualization data, physically based rendering data for the one or more materials of the three-dimensional item; and
   forming, by the device, a container that includes the visualization data and the physically based rendering data, wherein the visualization data is stored using a file format that does not support the physically based rendering data,
   wherein the one or more materials comprises a gem or glass, and
   wherein generating the physically based rendering data comprises:
   rasterizing a front face of the gem or glass as if it were opaque;
   performing ray tracing starting at the front face; and
   identifying intersections of light rays and a surface of the gem or glass, in part by sorting polygons of the surface of the gem or glass by area.

2. The method as in claim 1, wherein the file format is one of: graphics language (GL) Transmission Format (glTF), GL Transmission Format Binary (glB), Universal Scene Description (USDZ) format, or Filmbox (FBX) format.

3. The method as in claim 1, wherein forming the container comprises:
   inserting, by the device, the physically based rendering data directly into a file having the file format in a free-form extras field of the file.

4. The method as in claim 1, wherein the physically based rendering data for the one or more materials comprises an index of refraction.

5. The method as in claim 1, wherein the physically based rendering data for the one or more materials comprises high dynamic range (HDR) data.

6. The method as in claim 1, wherein the physically based rendering data for the one or more materials comprises bloom data.

7. The method as in claim 1, wherein the physically based rendering data for the one or more materials comprises anti-aliasing data.

8. The method as in claim 1, wherein the physically based rendering data for the one or more materials comprises tonemapping data.

9. The method as in claim 1, wherein generating the physically based rendering data comprises:
   computing reflected and refracted light for the one or more materials using one or more Fresnel equations.

10. The method as in claim 1, wherein generating the physically based rendering data further comprises:
assessing refracted light rays that exit the gem; and
sampling an environment map associated with the gem.

11. The method as in claim 10, wherein sampling the environment map comprises:
performing ray marching over a rendered frame buffer.

12. The method as in claim 1, wherein generating the physically based rendering data comprises:
computing a new cubemap for the gem that is centered around the gem;
building a connectivity graph of faces of the gem;
storing the connectivity graph of faces as a texture; and
identifying a closest intersection of a ray of light between neighboring faces of the gem.

13. The method as in claim 1, wherein the one or more materials comprise a metal.

14. The method as in claim 13, wherein generating the physically based rendering data comprises:
rasterizing the visualization data using a parameter that quantifies a degree of metalness of the one or more materials.

15. The method as in claim 1, further comprising:
providing the container to an endpoint client via an online application.

16. A method comprising:
obtaining, by a device, visualization data that depicts a three-dimensional item;
identifying, by the device and from the visualization data, one or more materials of the three-dimensional item;
generating, by the device and based on the visualization data, physically based rendering data for the one or more materials of the three-dimensional item; and
forming, by the device, a container that includes the visualization data and the physically based rendering data, wherein the visualization data is stored using a file format that does not support the physically based rendering data,
wherein the one or more materials comprises a gem or glass,
wherein generating the physically based rendering data comprises:
rasterizing a front face of the gem or glass as if it were opaque;
performing ray tracing starting at the front face;
assessing refracted light rays that exit the gem or glass; and
sampling an environment map associated with the gem or glass, and
wherein sampling the environment map comprises:
performing ray marching over a rendered frame buffer.

17. A method comprising:
obtaining, by a device, visualization data that depicts a three-dimensional item;
identifying, by the device and from the visualization data, one or more materials of the three-dimensional item;
generating, by the device and based on the visualization data, physically based rendering data for the one or more materials of the three-dimensional item; and
forming, by the device, a container that includes the visualization data and the physically based rendering data, wherein the visualization data is stored using a file format that does not support the physically based rendering data,
wherein the one or more materials comprises a gem or glass, and
wherein generating the physically based rendering data comprises:
computing a new cubemap for the gem or glass that is centered around the gem or glass;
building a connectivity graph of faces of the gem or glass;
storing the connectivity graph of faces as a texture; and
identifying a closest intersection of a ray of light between neighboring faces of the gem or glass.

* * * * *